Aug. 7, 1928.
A. G. F. KUROWSKI
1,679,727
TYPEWRITING MACHINE
Filed July 6, 1925    4 Sheets-Sheet 1
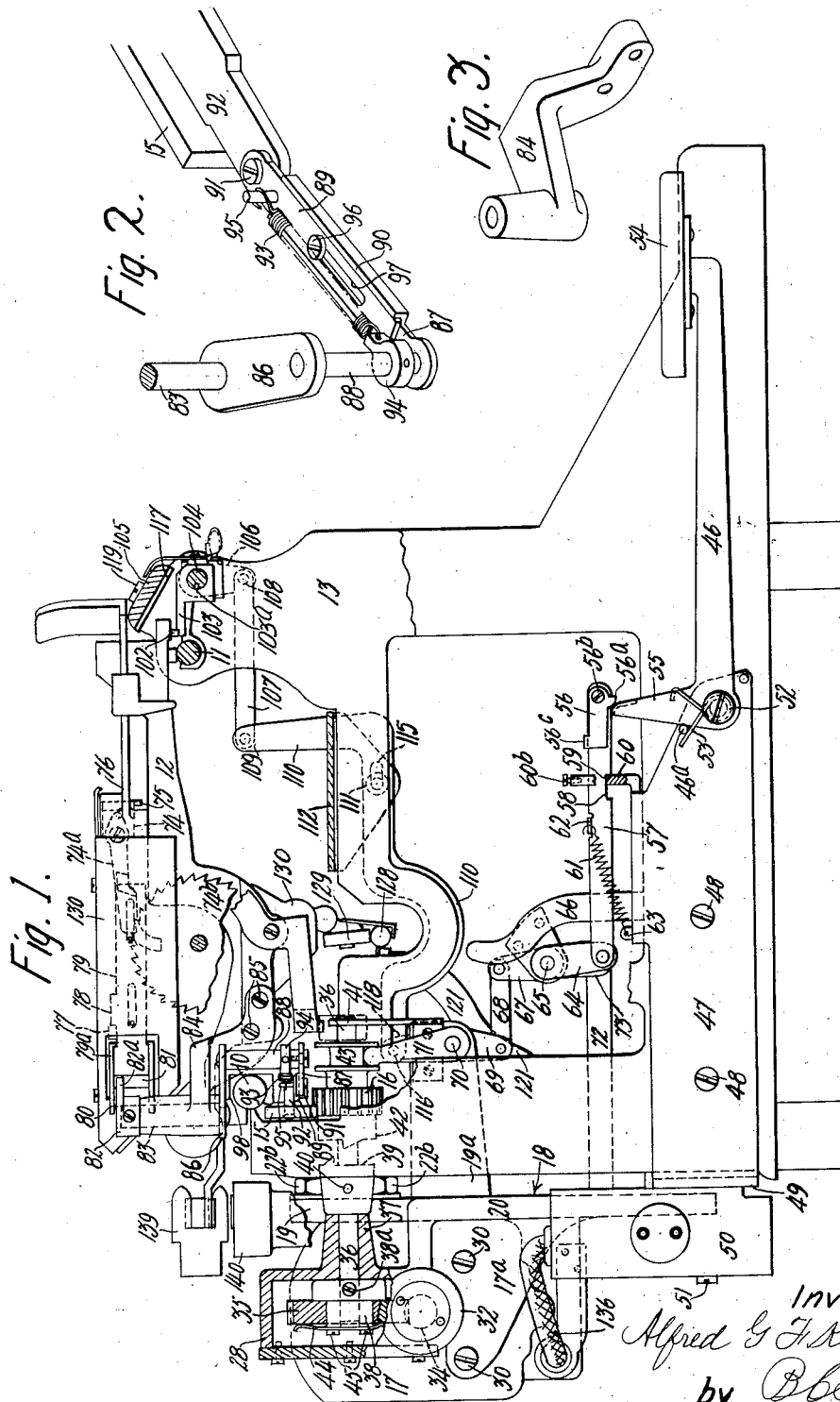
Inventor:
Alfred G. F. Kurowski
by D. C. Stickney
Attorney

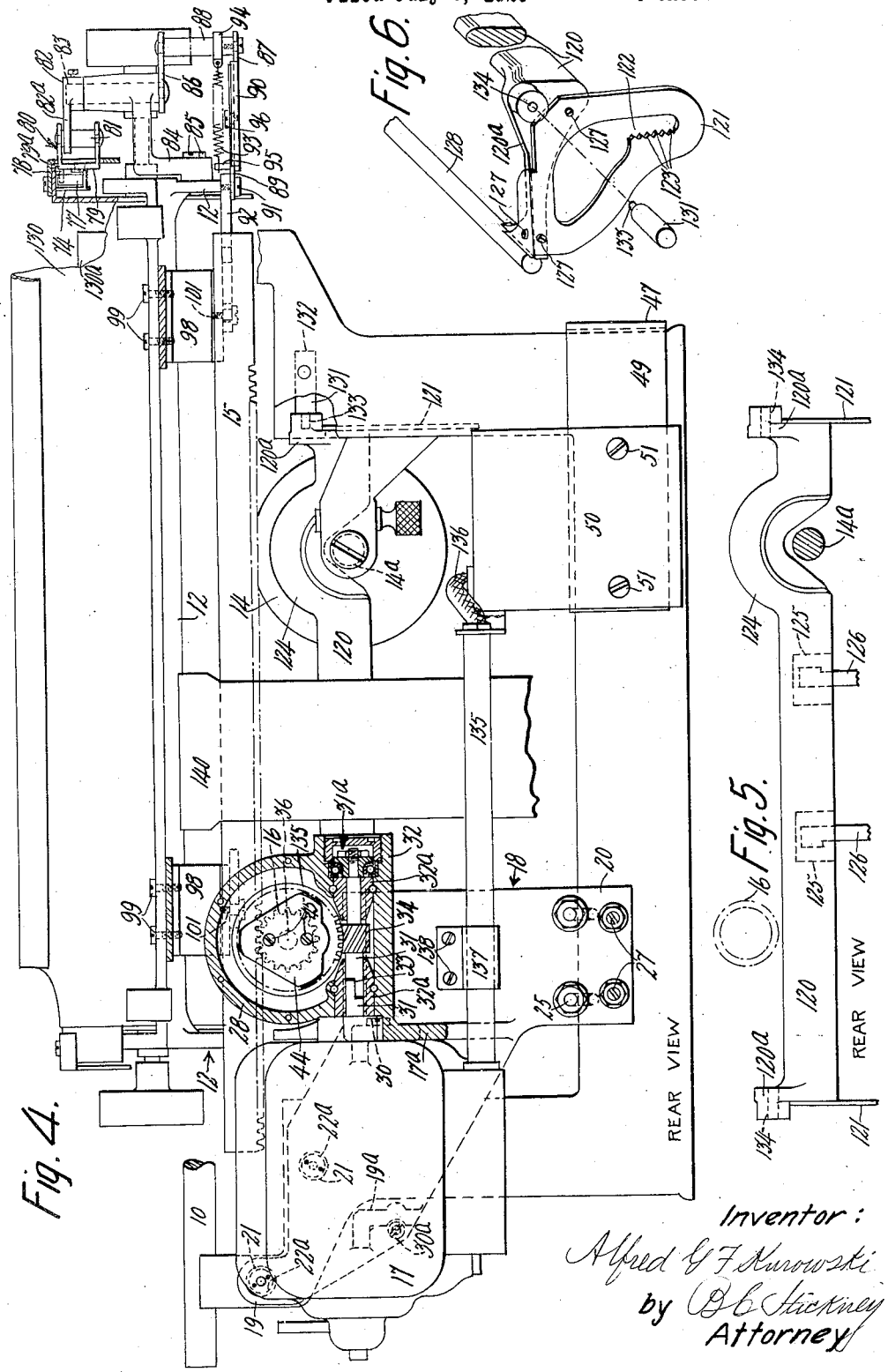

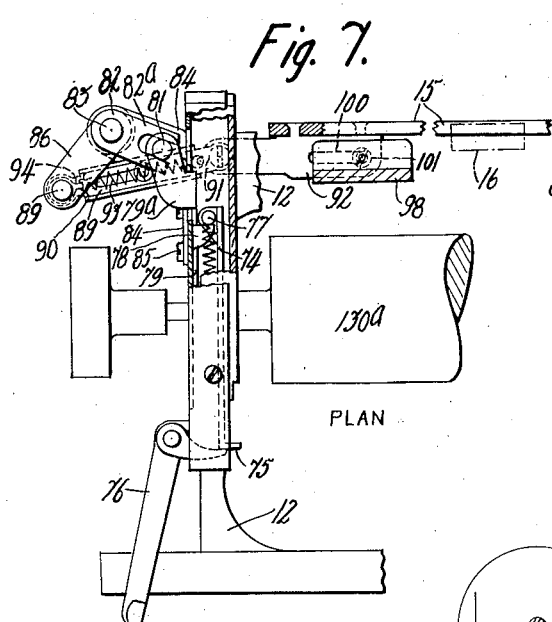

Aug. 7, 1928.  
A. G. F. KUROWSKI  
1,679,727  
TYPEWRITING MACHINE  
Filed July 6, 1925  4 Sheets-Sheet 4

Inventor  
Alfred G F Kurowski  
by O C Stickney  
Attorney

Patented Aug. 7, 1928.

1,679,727

UNITED STATES PATENT OFFICE.

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE.

TYPEWRITING MACHINE.

Application filed July 6, 1925. Serial No. 41,507.

This invention relates to typewriting machines, and more particularly to power means for returning the carriage and linespacing the platen for beginning a new line of writing.

There is mounted preferably upon the rear framework of the typewriting machine a power-unit including an electric motor and suitable clutch mechanism for operatively connecting a carriage-return rack and driving pinion with the motor. A finger-piece, conveniently mounted at the side of the machine adjacent the usual bank of type-keys, is operable to actuate a train of connections causing engagement of a pair of clutch-jaws connecting the motor to the driving pinion and conjointly closing an electric switch whereby to energize the motor, thus effecting a return travel of the carriage. At the end of the carriage-return travel, suitable cam means controlled by the carriage become effective to engage a rocker, which in turn actuates another train of connections, disengaging the clutch-jaws and releasing the electric switch to stop the motor. The connections which operate the clutch and switch include a one-way driving cam and a latch-piece, the latter having a notch normally engaged by a suitable lip or shoulder fixed to the framework of the machine. Upon operation of the finger-piece, a cam portion forming a part of the finger-piece engages the driving cam and raises the latch-piece sufficiently to disengage the notch from its holding lip, and a tension-spring causes a sliding movement of the latch, thereby actuating the clutch-closing connections and maintaining the clutch-jaws engaged until the carriage reaches the end of its return travel. The aforementioned cam means associated with the carriage is effective at the end of the carriage-return travel to disengage the clutch-jaws and at this time the latch-piece moves back to engage its notch with the holding lip, the driving pawl effecting a tripping movement over the cam portion of the finger-piece, and assuming its normal position at the front thereof.

For taking up shock incident to starting the carriage on its return travel, there is provided a frictional connection between the motor and the driving pinion, so that when the motor is energized said frictional connection will permit sufficient slippage between the motor and the carriage to start the carriage on its return travel without shock or jar. The frictional connection prevents damage to the motor and the associated parts in the event of failure of the mechanism to open the motor-circuit and the clutch at the end of the carriage-return travel. There is also provided means for cushioning the action of the line-space pawl and ratchet-wheel.

The foregoing mechanism is arranged to be readily attached to an Underwood standard machine with a minimum of changes or additions to the machine, the only requirement being the boring of a pair of screw-holes in the carriage-frame and slightly enlarging another existing hole for mounting a rock-shaft therein. The various parts of the attachment include supporting brackets and linkage utilizing, as securing means, screws or bolts already provided on the machine, and the substitution for a few standard parts of special parts comprising features of the present invention.

One of the features of the present invention is the provision of suitable clutch-mechanism and a friction device associated therewith, whereby to relieve the carriage of any shock or jar incident to starting the same on its return travel.

Another feature of the invention is the provision of a novel pawl or trip for permitting the operating linkage to return to normal position at the completion of the carriage-return travel.

Another feature of the invention is the provision of a mounting or base for the motor which is quickly attachable to a standard machine without alteration or additions thereto, and which may be adjusted in position on the frame of a machine.

Another feature is the provision of line-space actuating means permitting case-shifting operations of the platen, there being a resilient or cushioning connection between the carriage-return rack and said line-space actuating means.

Other features and advantages will hereinafter appear.

In the accompanying drawings,

Figure 1 is a side elevation of a standard Underwood typewriting machine with parts broken away, to more clearly illustrate the application of my invention thereto.

Figures 2 and 3 are details of a cushioning device associated with the carriage-return and the line-space mechanisms.

Figure 4 is a rear view of a typewriting machine, parts of the motor-drive and line-spacing mechanism being shown in section.

Figures 5 and 6 are details of the case-shift frame.

Figure 7 is a top plan view partly in section of the platen and line-spacing mechanism therefor, the parts being in position about to start a line-spacing operation.

Figure 8 is a similar view, showing the completion of a line-spacing operation.

Figure 9 is a detail view in perspective of the right-hand side of the typewriting machine, showing a portion of the linkage which operates to disengage the clutch and the electric switch.

Figure 10 is a fragmental side view of the rear framework of a typewriting machine, showing a mounting base for the motor, and means for attaching the base to the framework.

Figure 11:
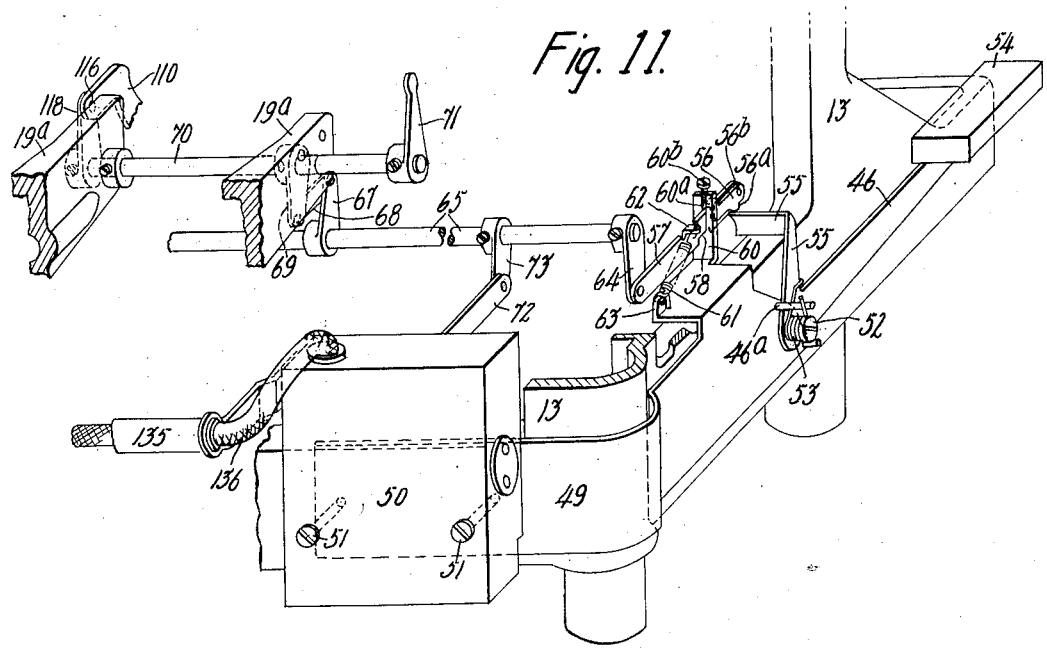
Figure 11 is a perspective view, broken away in a section, and showing the operating lever and a portion of the linkage for actuating the clutch-mechanism and controlling the electric switch.

Referring particularly to Figure 1 of the drawings, the reference numerals 10 and 11 indicate the usual rails supporting a carriage 12 for letter-feed and return movements within the frame 13 of the typewriter and a spring-drum 14 causes the usual strap (not shown) to move the carriage along its rails in letter-feeding direction upon actuation of suitable escapement mechanism, not shown, but which is well understood in the art, and need not be illustrated herein, as it forms no part of the present invention.

For returning the carriage, there is provided a carriage-rack 15 which meshes with a pinion 16, the latter being driven by a motor 17, and suitable clutch-mechanism is interposed between the motor and the pinion 16, so that the pinion may be either connected to the motor or disconnected therefrom.

Figure 12:
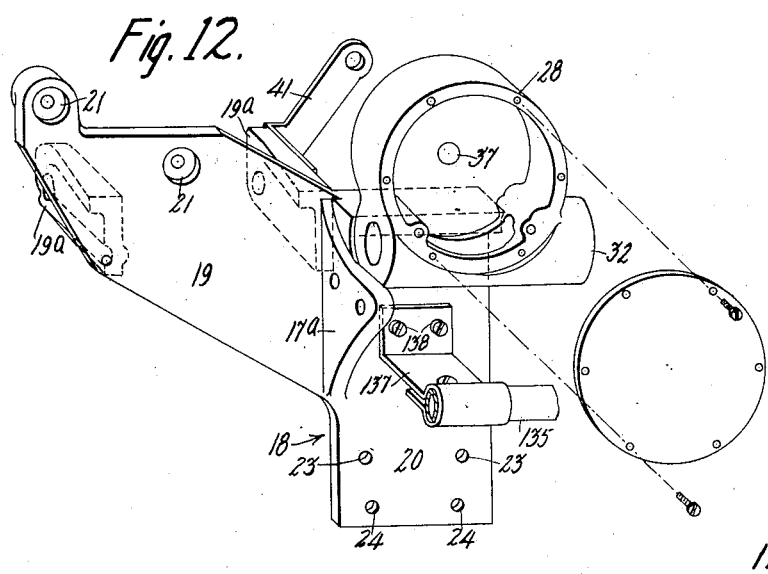
Figure 12 is a detail perspective of the base, by means of which the driving motor is mounted on the frame of the typewriter.

Referring with particularity to Figures 10 and 12, it will be observed that the motor is conveniently mounted at the rear of the machine on the main frame 13, and, for this purpose, there is provided a base or sub-frame 18 having a lateral extension 19 and a main body-portion 20. The lateral extension may be bored out and provided with pockets at 21 for the reception of suitable machine studs 22 which thread into holes in the frame 13 to secure said extension 19 in place, the screw-holes being usual in the machine and therefore not requiring any changes to be made or drilling at this point.

Threaded spanner nuts 22$^a$ are screwed down upon the studs 22 to home position within the pockets 21 and nuts 22$^b$ may be used as spacers or lock-nuts between the frame 13 and the rear side of the base 18. The lower part of the body-portion 20 has a series of perforations 23 and 24. The perforations 23 receive the threaded shanks of hooks 25 which engage around the lower part of the frame 13 of the typewriting machine, as indicated at 26. The lower perforations 24 receive set-screws 27 which bear against said lower part of the frame 13 to properly adjust and secure the base-plate 18 to said frame and hold the hooks 25 in engaged condition. The upper portion of the base 18 is formed with an annular housing 28 which contains parts of the motor-drive mechanism, now to be described.

The motor 17 is fastened to the base 18 by means of screws 30 passing through an outstanding support 17$^a$ and has a driving shaft 31 extending into a sub-housing 32 of the housing 28. Bearings 32$^a$ carried by the sub-housing 32 receive the shaft 31. A screw 30$^a$ also secures the motor to the extension 19. The shaft 31 may be formed in two parts as indicated at 33 and provided with a thrust bearing as illustrated at 31$^a$. A worm-gear 34 is fastened to the shaft 31 and meshes with a gear 35 mounted upon a shaft 36 which extends rearwardly through a bearing 37 in the housing 28. The shaft 36 carries a shouldered collar 38 secured by a set screw 38$^a$ and provides a mounting for the gear 35. A clutch-jaw 39 is attached to the shaft 36 by means of any suitable means, such as a pin 40, said shaft extending inwardly of the machine and having its free end supported by a bracket 41 attached to one of a pair of supports 19$^a$ of the extension 19. A complementary clutch-jaw 42 is freely revoluble on the shaft 36 with the pinion 16 and is engageable by the clutch-member 39 to drive the pinion 16 and thereby cause the rack 15 to return the carriage. There is also provided a flanged collar 43 which slides upon the shaft 36, and is attached to the pinion 16 and the complementary clutch-jaw 42. A suitable finger 71 projecting between the flanges of the collar is actuated by mechanism presently to be described for throwing the clutch-jaws into or out of engagement. Said clutch-jaw 42, pinion 16 and collar 43 form a single unit and may be made in one piece, thereby simplifying the construction. It will be seen that upon closing the clutch-jaws 39 and 42 and energizing the motor 17, the drive-shaft 31 of the motor 17 will cause the worm-gear 34 to turn the gear-wheel 35 and thereby drive the pinion 16.

In order to obviate any shock or jar due to overcoming the inertia of the carriage and starting the same on its return travel a friction device is provided in the form of a spring-plate 44, attached to the end of the shouldered collar 38 of the shaft 36, by means of screws 45, or in any other manner found desirable. The spring-plate may be in the form of a triangular shaped element of resilient material having its corners rounded and bent in toward the gear-wheel 35, so as to make frictional contact thereagainst, and thereby permit the gear-wheel 35 to partake of restrained rotatation upon the collar 38. (See Figures 1 and 4.)

For throwing the clutch-jaws 39 and 42 into locking engagement with one another, there is provided a train of linkage between the flanged collar and an operating lever or key 46, which may be disposed conveniently at the left side of the typewriter, adjacent the usual bank of type-keys (not shown). A plate or sub-frame 47 attachable to the framework of the machine, by means of screws 48 in holes already existing on the machine, provides a mounting for the operating lever 46. The plate 47 is bent around the rear of the machine, as indicated at 49, to provide a mounting for an electric switch 50 secured by screws 51. The lever 46 is pivotally mounted at 52 and may be provided with a wire spring 53 for returning the lever to normal position against a stop 46ª. The lever 46 is in the form of a bell-crank which rocks about the pivot 52, and has a finger-piece or bar 54 depressible for throwing the bell-crank about its pivot whereby to cause a rounded-cam 55ª carried by the end of an arm 55 of said bell-crank to engage the depending finger or heel 56ª of a one-way driving pawl 56 pivoted at 56ᵇ to one end of a slide or latch-piece 57 having a notch 58 arranged to be engaged by a lip 59 formed on an upstanding portion 60 of the plate 47, the camming action against the finger being effective to lift the notch 58 free of the lip 59. Said lip may be formed by cutting a slot 60ª in the portion 60, the latch-piece 57 being received in the slot. A screw 60ᵇ may be used to close the upper part of the slot. The pawl 56 has a stop 56ᶜ normally engaged with the upper edge of the latch-piece 57. Upon release of the latch-piece 57, a tension-spring 61, fastened at one end to said latch-piece 57 by an ear 62 and at the opposite end to the plate 47 by a similar ear 63, causes the slide to move rearwardly of the machine and thereby impart motion to an arm 64 mounted upon a rock-shaft 65 journaled in a bracket 66 at one side of the machine and in a similar bracket (not shown) adjacent the opposite side of the machine. This causes an arm 67 also carried by the rock-shaft 65 to move a link 68 and thereby rock another arm 69 carried upon a rock-shaft 70 journaled in supports 19ª to impart motion to an arm or finger 71 which has the free end thereof in engagement between the flanges of the collar 43. Movement of the arm 71 is rearward of the machine, and thereby causes the clutch-jaw 42 to engage the clutch-jaw 39 and thus connect the driving motor with the pinion 16 which is thereby revolved to cause the rack 15 to return the carriage.

To energize the motor 17, a link 72 is projected into the switch-box 50 to cause an electrical contact to be made. The link 72 is pivotally connected to the free end of an arm 73 securely mounted upon the rock-shaft 65.

For line-spacing the platen there is provided special mechanism in place of the ordinary line-spacing mechanism. The special mechanism is operated by the carriage-return rack 15. In place of the ordinary slide used on the standard typewriting machine, there is provided a slide 74 having the usual bent portion 75, against which the heel of ordinary line-space and carriage-return handle 76 engages to force the slide rearwardly to drive the pawl 74ª, which actuates the line-space ratchet-wheel 74ᵇ. At the opposite end of the slide 74 there is an upstanding pin 77 which is arranged to be engaged by a finger 78 carried by a slide 79, the finger 78 being effective to pull the slide 74 rearwardly. The slide 79 may be formed from sheet-material, and includes a pair of ears 79ª bent at right angles to provide a yoke 80 for mounting a pin or stud 81. A lever 82 has a vertical shaft 83 journaled in a bracket-member 84, fastened to the carriage frame 12 by any suitable means, such as screws 85, and a fork 82ª provided in the lever 82 engages around the pin 81. It will be seen that the space provided between the ears 79ª of the yoke 80 permits case shifting of the platen carriage 12 without interference with the lever mounting 82. An arm 86 is fixed to the shaft 83, and is arranged to move the forked member about the shaft 83 to actuate the slide 79 and thereby cause line-spacing of the platen.

Resilient means is provided for connecting the free end of the arm 86 with the carriage-return rack 15, so as to absorb shocks or vibrations during actuation of the line-spacing mechanism. The resilient connection includes a channel-member 87 connected by means of a pivot-rod 88 to the free end of the arm 86, the channel-member 87 being arranged to receive a slide 89, the sides 90 of the channel acting as guides for the slide 89. The slide 89 is pivotally connected at 91 to a shelf 92 secured to the rack-bar 15. A tension-spring 93 is connected by means of a sleeve 94 to the pivot-rod 88, the other end of the spring being attached to a pin 95 mounted on the slide 89 adjacent the pivot 91. A set-screw 96 passes through a slot 97 in the slide 89 and into threaded engagement with the channel-member 87. Upon actuation of the carriage-return rack 15, the slide 89 is pulled along the channel-member 87 under the restraining action of the spring 93 to hold the slide and channel together, thereby imparting a cushioning action to the movement of the rack-bar 15, and at the same time cushioning the action of the finger 78 against the pin 77, which imparts motion to the line-spacing mechanism. The carriage-rack is supported on the framework of the carriage 12, by means of brackets 98 secured to the carriage-frame by fasteners, such as screws 99. The lower portion of the bracket is turned at right angles toward the rack-bar 15, the latter having an elongated slot 100 formed in each of the shelf-members 92, and a headed pin 101, carried by each of the bracket-members 98, extends through a corresponding slot 100 and thereby provides a loose connection between the carriage 12 and the rack-bar 15, the pins acting as stops to control the relative displacement of the rack and carriage.

Upon energizing the motor 17 and closing the clutch-jaws 39 and 42 by actuation of the finger-piece 54 the rack-bar starts on its carriage-returning operation, and it will be observed that, due to the slots 100, the line-space operation will be completed before the pins 101 have moved sufficiently along the slots 100 to engage the ends thereof to commence return travel of the carriage. After completion of the line-space operation the pins engage the ends of the slots 100, as indicated in Figure 8, and are thereby effective to return the carriage.

It is necessary to provide means for disconnecting the clutch and electrical switch as the carriage reaches the end of its return movement, and for this purpose there is provided on the carriage, a cam-piece 102 which engages the free end of a rocker 103 fastened by means of a spline 103ª, or otherwise, to a rock-shaft 104, conveniently journaled adjacent the usual scale-plate 105 of the machine. Actuation of the rock-shaft 104 rocks on arm 106 forwardly to impart motion to a link 107 connected at 108 to the free end of the arm 106. The other end of the link 107 is attached to the forward end 109 of a sliding connection 110. The connection 110 is supported adjacent its forward end by means of a headed pin 111, threaded into a special bracket 112 fixed to framework 113 of the usual type-bar segment by means of screws 114 already provided on the machine. The pin 111 rides in a slot 115 of the connection 110, thereby slidingly supporting the latter. The other end of the connection 110 is pivoted at 116 to an arm 118 fixed to the rock-shaft 70.

As the rock-shaft 70 is actuated, the arm or finger 71 moves forwardly of the machine to release the clutch-jaws 39 and 42. Also the electric switch is opened by means of the forward pull of the link 72. During this stopping operation, the latch-piece 57 is projected forwardly, so as to permit the notch 58 to re-engage the lip 59 and the pawl 56 rocks about its pivot 56ᵈ, effecting a tripping action over the rounded cam 55ª and falls by gravity to position at the forward portion of the rounded cam 55ª where it is in normal position for actuation by the lever 46 to re-enact the cycle of carriage-returning operations already explained.

If for any reason the mechanism should fail to open the clutch and the motor-circuit, the motor would continue to run slowly against the restraining action of the friction device described, the adjustment being such that under ordinary operating conditions there is no slippage, but upon failure of the mechanism, as stated, the slippage is sufficient. This prevents damage to the motor and the associated mechanism.

In mounting the rock-shaft 104 for rocking movement in the frame of the machine, the usual perforations already existing in the machine for supporting the usual margin-stop rod are bored a little larger to accommodate the rock-shaft 104. A bracket or bearing piece 117 is secured beneath the usual scale-plate 105 by means of screws 119. It is therefore seen that without very much alteration the rock-shaft 104 may be readily mounted in a standard machine.

In order to provide clearance for certain parts of the machine, such as the clutch parts of the machine and the support for the spring-mechanism and the support for the spring-drum of the carriage-feeding mechanism, the usual case-shift frame is removed and a special frame substituted therefor. Said special case-shift frame is designated by the reference numeral 120, and includes arms 120ª and side-frames 121, the latter having cut-out portions 122 and teeth 123 engageable by the usual spring, not shown, for relieving the weight of a case-shifting platen-frame 130. The frame 120 is also provided with a goose-neck or yoke 124 for clearing the support 14ª of the spring-drum 14, and has pockets or recesses 125 to provide clearance for parts of the letter-feed operating mechanism indicated at 126. The side-frames 121 are secured to the arms 120ª by any suitable means such as screws 127. The frame 120 carries at its forward portion a case-shift rail 128, upon which a roller 129 of the case-shifting platen-frame 130 is supported, and pins 131 fastened in the frame of the machine at 132 are reduced at 133 for engagement with recesses 134 in the shift-frame 120, thereby providing for rocking movement of said shift-frame 120 to case-shift the platen 130ª.

For conveying electrical energy to the electric motor, there may be provided a conduit 135, through which a cable 136 leads from the switch 50 to connections within the motor 17, and a bracket 137 encircling the conduit 135 may be fastened to the base 18 of the motor by screws 138.

The mechanism is readily attachable to machines equipped with a decimal-tabulator as will be readily understood by a consideration especially of Figures 1 and 4, wherein tabulator-stops 139 and a tabulator-stop-bar housing 140 are illustrated. It is seen that the tabulator-mechanism is clear of and not interfered with in any way by the carriage-returning attachment described.

Variations may be resorted to within the scope of the invention, and portions of the improvements may be used without others.

Having thus described my invention, I claim:

1. In a typewriting machine, the combination with a platen and a letter-feeding carriage including a rack-bar, of a carriage-returning device attachable as a unit to the frame of the machine, said unit including a sub-frame attachable to the rear of the machine-frame, an electric motor carried by the sub-frame, a secondary shaft driven by the shaft of the motor, a support associated with the sub-frame for supporting the end of the secondary shaft, a clutch-jaw secured to the secondary shaft, a second clutch-jaw freely revoluble on the secondary shaft, a pinion fixed to the second clutch-jaw and in mesh with the rack-bar of the carriage, a frictional connection between the first clutch-jaw and the driving shaft of the motor, key-operated means for closing the clutch-jaws and the motor-circuit, and means for opening said clutch-jaws and said motor-circuit as the carriage reaches the end of its return travel.

2. In a typewriting machine, the combination with a platen and a letter-feeding carriage including a rack-bar, of a carriage-returning device attachable as a unit to the frame of the machine, said unit including a sub-frame, an electric motor carried by the sub-frame, a secondary shaft carried by the sub-frame, a worm-and-wheel drive between the motor-shaft and the secondary shaft, a frictional connection between the wheel and said secondary shaft, a pinion and releasable clutch-jaws carried by the secondary shaft, the pinion being in mesh with the rack-bar, key-actuated devices for closing the clutch-jaws and the motor-circuit whereby to start the carriage on its return travel, a cam, and means operated by said cam as the carriage reaches the end of its return travel for opening the clutch-jaws and the motor-circuit.

3. In a typewriting machine, the combination with a platen and a letter-feeding carriage, of a carriage-returning device attachable as a unit to the frame of the machine, said unit including a sub-frame, an electric motor carried by the sub-frame, a worm-gear carried by the shaft of the motor, the worm being mounted in a housing forming part of the sub-frame, the motor-shaft being made in two sections, whereby the motor may be detached from the sub-frame without removing the worm-gear, a worm-wheel meshing with the worm-gear, a spindle mounted for rotation within the sub-frame, the worm-wheel being mounted upon the spindle and turnable thereabout, a friction plate carried by the spindle and having fingers pressing against the worm-wheel, whereby the latter may partake of restrained rotation upon the spindle, clutch-mechanism between said spindle and the rack-bar of the carriage, key-actuated mechanism for closing the clutch-mechanism and the motor-circuit, and means for automatically disengaging said clutch-jaws and opening the motor-circuit as the carriage reaches the end of its return travel.

4. In a typewriting machine, the combination with a platen and a letter-feeding carriage including a rack-bar, of a carriage-returning device attachable as a unit to the frame of the machine, said unit including a sub-frame attachable to the rear of the machine-frame, an electric motor mounted on said sub-frame, a secondary shaft supported by said sub-frame, a worm-wheel frictionally attached to said shaft, a worm-gear carried by the motor-shaft and meshing with the worm-wheel, a clutch-jaw attached to the secondary shaft, a second clutch-jaw rotatable upon the secondary shaft and carrying a pinion which meshes with the rack-bar of the carriage, a collar attached to the second clutch-jaw and pinion, an arm associated with the collar, a key, operating connections between the key and said arm, whereby the second clutch-jaw is moved into engagement with the first clutch-jaw to connect the motor with the carriage-rack, said key also controlling the motor-circuit, and means for conjointly disengaging the clutch-jaws and opening the motor-circuit as the carriage reaches the end of its return travel.

5. In a typewriting machine, the combination with a case-shifting platen, a letter-feeding carriage including a rack-bar, a pin-supported spring-drum, and a strap driven by said drum and attached to the carriage, of a carriage-returning device attachable as a unit to the frame of the machine, said unit including a sub-frame mountable upon the rear of the main frame, an electric motor, a pinion driven by the motor and meshing with the carriage-rack, and a case-shift frame supported at opposite ends in the main frame, said case-shift frame having one portion of the body thereof dropped, so as to clear the driving pinion of the carriage-rack and another portion looped around the supporting pin of the spring-drum, so as to clear the latter.

6. In a typewriting machine, the combination with a platen and a letter-feeding carriage therefor including a rack-bar, of a carriage-returning device attachable as a unit to the frame of the machine, said unit including a sub-frame, an electric motor carried thereby, a secondary shaft, a worm-wheel, a frictional connection between the worm-wheel and the secondary shaft, a worm-gear carried by the shaft of the motor and meshing with the worm-wheel, a pinion carried by the secondary shaft and meshing with the rack-bar of the carriage, a releasable clutch between said pinion and said secondary shaft, a second unit including a sub-frame attached to the framework of the machine, said second sub-frame carrying a motor-switch and a key, connections controlled by said key for operating said motor-switch and the clutch, and means for releasing the clutch and opening the motor-switch as the carriage reaches a predetermined location on its return travel.

7. In a typewriting machine, the combination with a platen, a case-shift frame, and a letter-feeding carriage, of a rack-bar slidingly attached to the carriage and including means for limiting the sliding relation thereof, a motor adjacent the rear of the machine, releasable driving connections between the motor and the rack-bar, platen-line-space mechanism including a slide, a line-space pawl and a ratchet-wheel operatively associated with the slide, a pin fixed to the end of said slide, a second slide, a finger carried by the second slide and engaging said pin, said second slide including a yoke, a stud mounted between the arms of the yoke, the aforenamed line-space mechanism being mounted on the case-shift frame, a support attached to the carriage, a bell-crank lever pivotally mounted in said support and adjacent said second slide, said lever having an arm including a fork disposed between said arms of the yoke and engaging around said stud, the arms of the yoke being spaced apart, so as to provide clearance for the fork-carrying arm when the platen is case-shifted, and a cushioning connection between the other arm of the bell-crank lever and the carriage-return rack-bar for yieldingly transmitting motion from said rack-bar to the first-mentioned slide, whereby to actuate the line-space mechanism.

8. In a typewriting machine, the combination with a revoluble platen and a letter-feeding carriage therefor, of a carriage-return rack-bar attached to the carriage, a pinion meshing with the rack-bar, an electric motor, driving devices between the motor and the pinion including clutch-mechanism, a finger-piece, operating connections between the finger-piece and the clutch-mechanism, a motor-controlling switch, a link actuated by said connections for operating said switch, said connections including a releasable latch-piece which is effective upon actuation of the finger-piece to close the switch and the clutch and thereby cause return travel of the carriage, and means effective upon completion of the carriage-return travel to operate said connections, whereby to open said switch and release said clutch and also return said latch-piece to normal position.

9. In a typewriting machine, the combination with a revoluble platen and a letter-feeding carriage therefor, of a power-drive for returning said carriage, said drive including a rack-bar slidingly attached to the carriage and including means for limiting the sliding movement thereof, a motor, a pinion driven by the motor and engaging the rack-bar, a slide, a line-space ratchet-wheel and a driving pawl operatively associated with the slide, a pin fixed to the slide, a second slide having a finger for engaging said pin, whereby to move said first-named slide to actuate the line-space ratchet-wheel, said second slide carrying a pin, a pivotally-mounted rocker including a forked arm engaging said last-named pin, and a flexible connection between said rocker and the rack-bar, whereby, upon actuation of the motor, said rack-bar yieldingly actuates the line-space mechanism before said rack-bar reaches its limiting means.

10. In a typewriting machine, the combination with a revoluble platen and a letter-feeding carriage therefor, of means for returning the carriage, said means including a motor, clutch-mechanism including releasable clutch-jaws, a bell-crank pivoted adjacent the side of the machine, a finger-piece carried by one of the arms of the bell-crank, a cam carried by the free end of the other arm, operating connections between the clutch and said finger-piece, said connections including a latch having a notch therein, a shoulder fixed to the frame of the machine and arranged to engage said notch, to hold the clutch-jaws normally disengaged, a pawl pivoted adjacent the end of said latch and including a rounded heel for engagement by said cam, whereby actuation of the finger-piece causes said cam to act upon said rounded heel to raise the latch and thereby free the notch from said shoulder, resilient means for moving said latch when released, whereby to cause said clutch-jaws to engage, and means automatically effective when said carriage reaches the end of its travel to operate said connections to disengage said clutch-jaws and reset said latch and pawl in normal position, said motor being controlled by the aforenamed finger-piece.

11. In a typewriting machine, the combination with a revoluble platen and a letter-feeding carriage therefor, of means for returning the carriage, said means including a motor and driving connections to the carriage, a base for mounting said motor upon the frame of the typewriter, said base including a main body, adjustable hooks carried adjacent the lower portion of said body and engaging around the lower portion of said frame, set-screws threaded through said base adjacent said hooks and adjustable therewith to properly position said base relatively to said frame and maintain the base rigid thereon, an outstanding support carried by said body for mounting the motor, an extension from said body to the upper framework of the machine, and fasteners securing said extension to said upper framework.

12. In a typewriting machine, the combination with a platen and a letter-feeding carriage therefor, of a rack-bar carried by the carriage, a pinion meshing with the rack-bar, a pinion-shaft for the pinion, a motor including a driving-shaft, a worm-gear fixed to said driving-shaft, a worm-wheel meshing with said worm-gear, a collar fixed to said pinion-shaft, the worm-wheel being rotatably mounted upon the collar, the outer end of said collar projecting slightly beyond the outer face of said worm-wheel, and a resilient plate attached to said outer end of the collar, said plate including portions in frictional engagement with said outer face of the worm-wheel, whereby said plate forms a frictional power-transmitting connection between said worm-wheel and said pinion shaft.

13. In a typewriting machine, the combination with a revoluble platen, a letter-feeding carriage therefor, and line-spacing mechanism, of a rack and supporting means therefor attachable as a unit to the carriage, a motor, a pinion meshing with the rack and driven by the motor, said rack having elongated slots, a pair of depending brackets attached to said carriage, the lower portion of each of said brackets being arranged to receive said rack in sliding relation, headed screws passing through said rack and into threaded relation with each bracket, and a cushioning connection between the rack and the line-spacing mechanism whereby said motor is effective to resiliently line-space the platen before the ends of said slots meet their respective pins and thereby cause a return of the carriage.

14. In a typewriting machine, the combination with a revoluble platen, a letter-feeding carriage therefor, a carriage-returning drum including a supporting pin, a case-shifting platen-frame, a carriage-rack, and a motor having a driving pinion meshing with the rack, of a case-shift frame for operating said platen-frame, said case-shift frame including a body-portion dropped to clear the driving pinion and then looped around the supporting pin, means for actuating said case-shift frame, said case-shift frame having pockets adjacent both ends thereof, pins engaging said pockets and fixed to the frame of the machine, said case-shift frame also including lateral arms, side plates carried by said arms, said plates being cut away to clear the pockets and bent over the top of the arms, fasteners securing said side plates to said arms, a case-shift rail at the free ends of said arms, and means supporting said platen-frame in sliding relation on the rail.

15. In a typewriting machine, the combination with a revoluble platen, a letter-feeding carriage therefor and writing instrumentalities including a type-bar-segment and a supporting frame therefor, of a motor, means for controlling the motor, carriage-driving means including clutch-mechanism between the motor and the carriage, means for closing the clutch to start the carriage on return travel, and means controlled by said carriage for opening the clutch, said last-named means including a cam, an arm engaged by said cam as the carriage reaches the end of its return travel, a rock-shaft carrying said arm, linkage between said arm and said clutch, said linkage including a slidable member having a slot therein, a bracket for said slidable member, said bracket being secured to the segment-supporting frame and bent over and around the side framework of the machine so as to overlie the outer face thereof, and a pin engaging said bracket through said slot, whereby to slidingly support said member upon the bracket.

16. In a typewriting machine having a platen, a platen-carriage and line-spacing mechanism, the combination of a rack having a lost-motion connection with the carriage, a resilient connection between said rack and said line-spacing mechanism, and means for moving said rack to line-space the platen and return the carriage to initial position.

17. In a typewriting machine having a platen, a platen-carriage and electrically-operated means to return the carriage to initial position, the combination of a circuit-controlling member operable to open or close the circuit of said electrically-operated means, a latch normally holding said member in open circuit position, means for releasing said latch to permit said member to close the circuit to cause operation of said carriage-return-means, and means operated by said carriage toward the end of its return-movement to return said latch to normal position to effect opening of the circuit.

18. In a typewriting machine, the combination with a platen and a letter-feeding carriage, of a carriage-returning device, including a motor having a shaft, a second shaft, a frictional driving connection between the motor-shaft and said second shaft, carriage-engaging means loosely mounted on said second shaft, and means for coupling said carriage-engaging means to said second shaft to effect return-movement of the carriage.

19. In a typewriting machine, the combination with a platen and a letter-spacing carriage, of means for returning said carriage including a motor, carriage-engaging means and a driving connection between the same and the motor, said connection including a clutch, a clutch-finger for operating said clutch, a circuit-controlling member operable to open or close the motor-circuit, said finger and said member being connected for simultaneous actuation, means for operating said finger and said member to close the circuit and connect the carriage-engaging means with the motor to return the carriage, and means operable toward the end of the carriage-return-movement to restore said finger and said member to initial position to brake the motor-circuit and disconnect the carriage-engaging means from the motor.

20. A supporting frame for the power-transmitting mechanism of a power-operated typewriter, said typewriter having a main framework, including rear corner-posts and a bottom cross-member connecting the same, said supporting frame being readily attachable as a unit to the rear of the main framework of the typewriter and including a main body-portion constructed to overlap and be attached to the rear bottom cross-member of the typewriter-framework, and a lateral extension integral with said body-portion and constructed to overlie and be attached to a corner-post of said framework.

21. A supporting frame for the power-transmitting mechanism of a power-operated typewriter, said typewriter having a main framework, including rear corner-posts and a bottom cross-member connecting the same, said supporting frame being readily attachable as a unit to the rear of the main framework of the typewriter and including a main body-portion constructed to overlap and be attached to the rear bottom cross-member of the typewriter-framework, a lateral extension integral with said body-portion and constructed to overlie and be attached to a corner-post of said framework, a motor-supporting flange projecting substantially at right angles to the plane of said body-portion, and a gear-housing mounted on the supporting frame.

22. A supporting frame for the power-transmitting mechanism of a power-operated typewriter, said typewriter having a main framework, including rear corner-posts and a bottom cross-member connecting the same, said supporting frame being readily attachable as a unit to the rear of the main framework of the typewriter and including a main body-portion constructed to overlap and be attached to the rear bottom cross-member of the typewriter-framework, a lateral extension integral with said body-portion and constructed to overlie and be attached to a corner-post of said framework, a motor-supporting flange projecting substantially at right angles to the plane of said body-portion, a gear-housing mounted on the supporting frame, and one or more supports extending from said frame oppositely to said flange, one of said supports carrying a bearing-bracket spaced from but in line with said housing.

23. A supporting frame for the power-transmitting mechanism of a power-operated typewriter, said typewriter having a main framework, including rear corner-posts and a bottom cross-member connecting the same, said supporting frame including a main body-portion overlying said cross-member and a lateral extension overlying a corner-post, and means for fastening said supporting frame to said main framework, said means including threaded hooks engaging the forward face of the cross-member and set screws engaging the rearward face of said cross-member, said hooks and screws serving to clamp the cross-member between them.

ALFRED G. F. KUROWSKI.